United States Patent [19]
Grudkowski et al.

[11] Patent Number: 5,159,420
[45] Date of Patent: Oct. 27, 1992

[54] DUAL MEDIUM HETEROJUNCTION ACOUSTIC CHARGE TRANSPORT MULTIPLE QUANTUM WELL SPATIAL LIGHT MODULATOR

[75] Inventors: Thomas W. Grudkowski, Glastonbury; Glen W. Drake, Stafford Springs; Frederick J. Leonberger, Glastonbury; Robert N. Sacks, Glastonbury; William J. Tanski, Glastonbury, all of Conn.

[73] Assignee: United Technologies Corporation, Hartford, Conn.

[21] Appl. No.: 777,883

[22] Filed: Oct. 15, 1991

[51] Int. Cl.⁵ ............................ H01L 27/14
[52] U.S. Cl. ........................ 357/30; 357/4; 357/26; 357/24; 357/16; 357/25; 359/248; 359/305; 359/306; 359/285
[58] Field of Search ............ 357/4, 25, 26, 24 LR, 357/16, 30 E, 30 Q; 359/312, 248, 305, 306, 307, 285

[56] References Cited

U.S. PATENT DOCUMENTS

| | | | |
|---|---|---|---|
| 4,491,811 | 1/1985 | Niitsuma et al. | 357/26 X |
| 4,893,161 | 1/1990 | Tanski et al. | 357/4 X |
| 4,935,935 | 6/1990 | Reed et al. | 357/26 X |
| 5,053,843 | 10/1991 | Choudhury et al. | 357/4 X |

OTHER PUBLICATIONS

W. D. Goodhue et al, "Quantum-well charge-coupled devices for charge-coupled device-addressed multiple-quantum-well spatial light modulators", *Journal of Vacuum Science and Technology*, B vol. 4, No. 3, May/-Jun. 1986, pp. 769-772.

Primary Examiner—William Mintel
Attorney, Agent, or Firm—Gerald L. DePardo

[57] ABSTRACT

A one-dimensional or two-dimensional transmission mode spatial light modulator (SLM) includes two different mediums, one medium being a semiconductor comprising one or more heterojunction acoustic charge transport (HACT) channels 28 with surrounding layers 26, 30 vertically adjacent to a multiple quantum well (MQW) region 22, and the other being a transparent piezoelectric insulating substrate 10 thick enough to allow a surface acoustic wave (SAW) 13 to propagate therein. The SAW 13 is launched in the substrate 10 by a transducer 12 and generates electric fields which propagate the charge along the HACT channel 28 in the semiconductor medium 18. Electrodes 32, 34, 36 carry charge to and from the HACT channel 28, and light 40 is applied to a surface 44 perpendicular to the MQW region 22. Charge packets 19 in the HACT channel 28 invoke electric fields within the MQW region 22 which determines the optical absorption and/or index-of-refraction thereof, thereby determining the intensity and/or phase of each output light beam 46. Light modulation is achieved by modulating the amount of charge injected and/or the characteristics of the SAW 11. Various different materials for the substrate 10 may be used to provide desired efects.

15 Claims, 2 Drawing Sheets

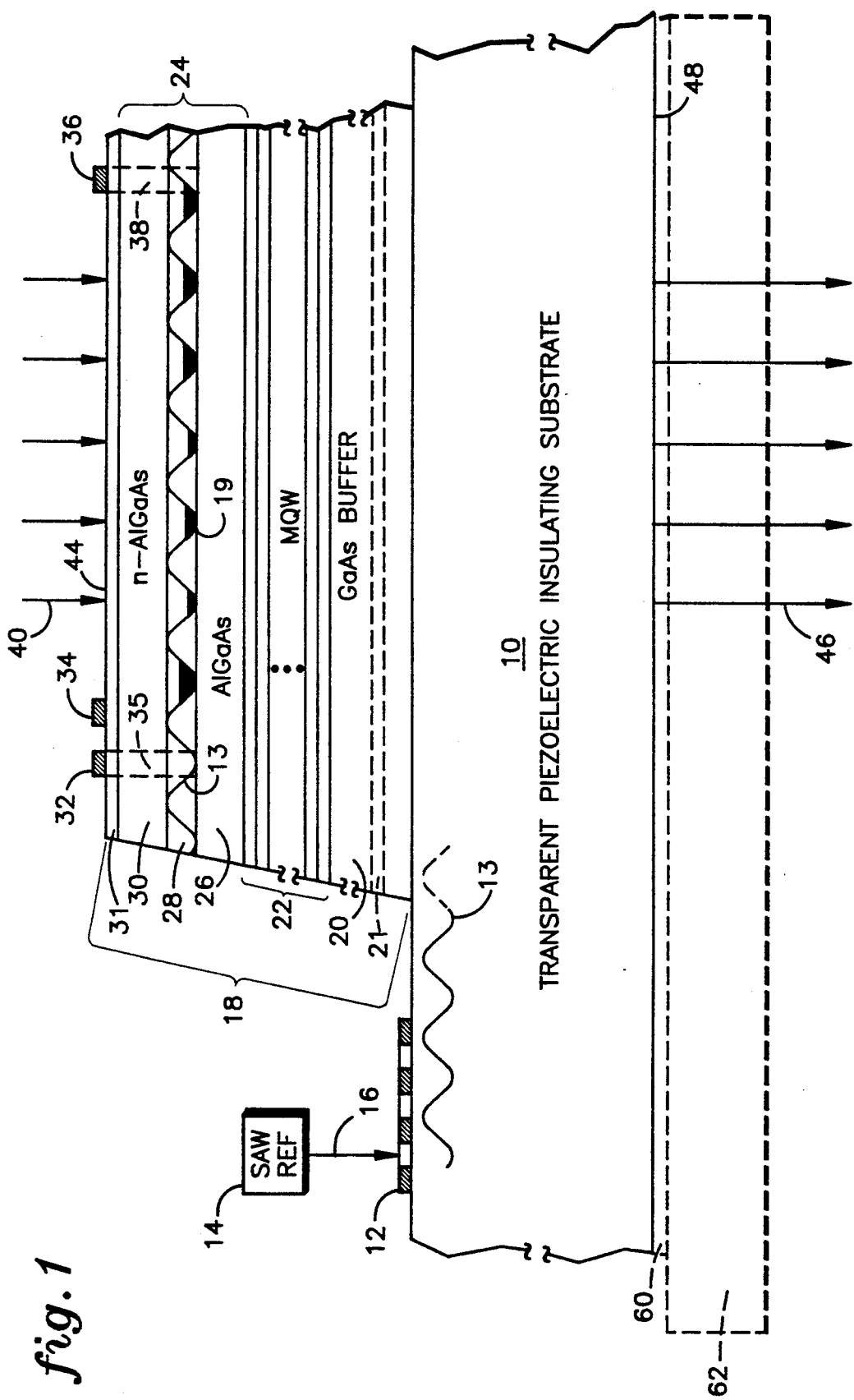

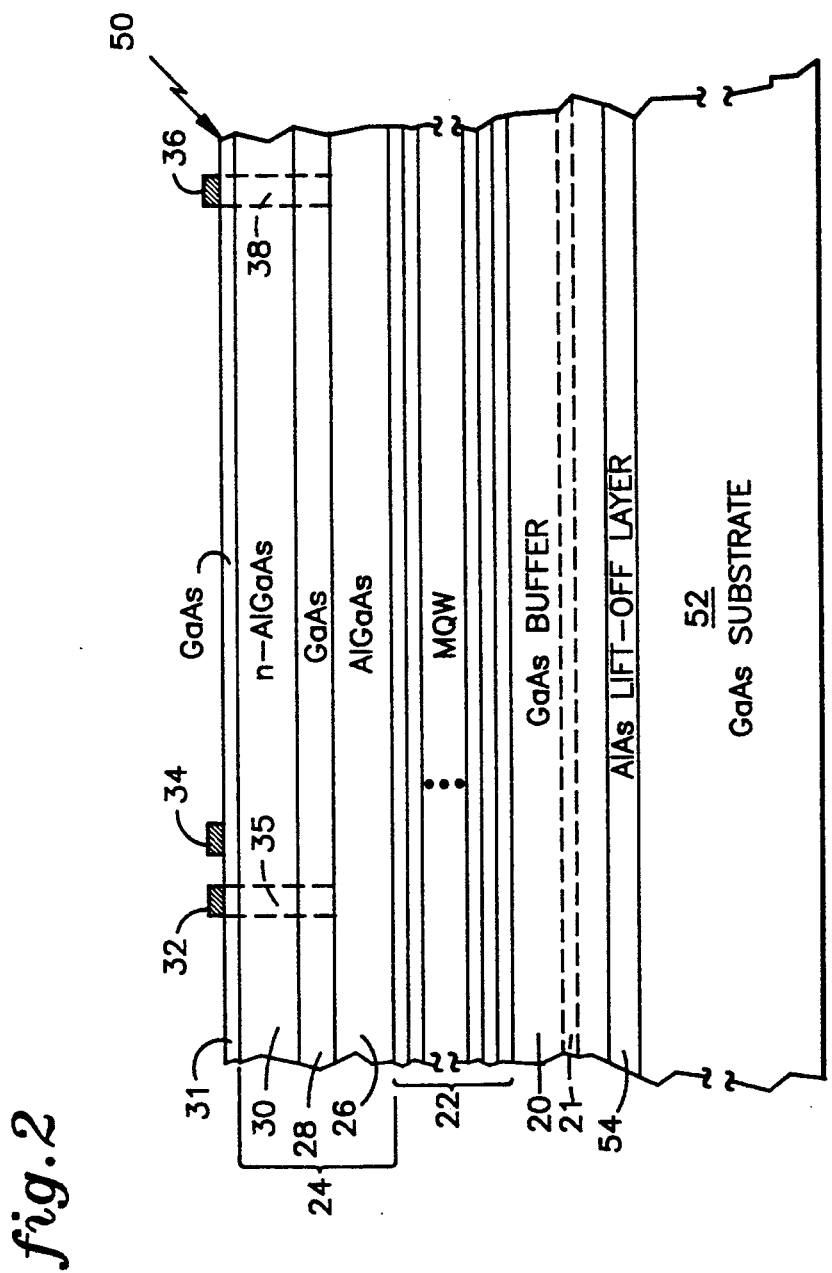

DUAL MEDIUM HETEROJUNCTION ACOUSTIC CHARGE TRANSPORT MULTIPLE QUANTUM WELL SPATIAL LIGHT MODULATOR

CROSS-REFERENCES TO RELATED APPLICATIONS

Copending U.S. Patent Applications, entitled "Thick Transparent Semiconductor Substrate Heterojunction Acoustic Charge Transport Multiple Quantum Well Spatial Light Modulator", and "Thick Transparent Expitaxial Layer Heterojunction Acoustic Charge Transport Multiple Quantum Well Spatial Light Modulator", Ser. Nos. 07/777,884 and 07/778,043, respectively, filed contemporaneously herewith contain related subject matter to that disclosed herein.

TECHNICAL FIELD

This invention relates to spatial light modulators and more particularly to transmission mode spatial light modulators having a heterojunction acoustic charge transport (HACT) channel, a multiple quantum well region, and two different mediums, i.e., a semiconductor and a piezoelectric insulator, working together.

BACKGROUND ART

A spatial light modulator (SLM), as is known, is a device which converts an input light beam, incident on a surface of the device, to an intensity or phase modulated output light beam in response to an electrical or optical input signal. A transmission mode SLM alters the optical absorption and/or index-of-refraction of the device as light passes through it, and uses the remaining light beam as the output beam (as apposed to projecting the input light at an angle to a surface and having the reflected portion of the beam be the output). An SLM, as is known, is very useful for one-dimensional and two-dimensional optical processing, including: matrix multiplication, spatial correlation, and Fourier transformation. It is also known that a charge coupled device (CCD) may be used with a multiple quantum well (MQW) region (described hereinafter) to make an SLM, as described in the article: W. D. Goodhue et. al., "Quantum-well Charge-coupled Device For Charge-coupled Device Addressed Multiple-quantum-well Spatial Light Modulators", *Journal of Vacuum Science and Technology*, Vol 4, No. 3, (May/June 1988).

A CCD, as is known, transports an input charge from one temporary storage site to another, at or slightly beneath the surface of a semiconductor. The charge is transferred from one location to the next by electrical clock pulses applied to a series of electrodes mounted to the surface of the CCD.

An MQW, as is known, is a region comprising alternating semiconductor layers, such as gallium arsenide (GaAs) and aluminum gallium arsenide (AlGaAs, also written as $Al_xGa_{l-x}As$ or (Al,Ga)As). The layers of the MQW region have a band-gap energy (i.e., the energy between the valence band and the conduction band for a given layer) pattern which alternates from one layer to the next, also known as multiple quantum wells (MQWs).

To create an SLM with a CCD, the MQW region is placed below the charge transportation area of the CCD. When a given input charge magnitude is above the MQW region, it invokes an electric field within the MQW, which causes the optical absorption coefficient of the MQW to change in response thereto. Thus, if a light beam is passed through the MQW, the magnitude of the charge present at a given time will determine the absorption of light by the MQW. More specifically, it is known that an electric field applied within the MQW changes the quantum energy levels of electrons and holes, which affects its absorption characteristics.

It is also known that the optical absorption coefficient ($\alpha$) of a semiconductor varies as a function of the optical energy (Eo) of the photons of the incident light. The optical energy Eo is defined as: $Eo = h\nu = hc/\lambda$, where h is Plancks constant; $\nu$ is the frequency, c is the velocity of light; and $\lambda$ is the wavelength of the incident light. Thus, the absorption coefficient $\alpha$ varies as the optical wavelength $\lambda$ varies. If the energy Eo of the photons is below the band-gap energy (Eg), also known as the absorption band edge, for the semiconductor, minimal photons are absorbed thereby. Conversely, if the energy Eo of the photons is greater than the band-gap energy Eg, the semiconductor will readily absorb the photons.

The MQW region, as is known, provides an optical absorption characteristic which can be treated as having a effective collective energy band-gap (more precisely called an optical absorption threshold) for the entire MQW region, between the bulk band-gaps of the two semiconductors used, i.e., larger than GaAs and smaller than AlGaAs, which varies with applied electric field strength. The MQW absorption threshold is due to the quantum-size and two-dimensional excitonic effects, as is known. Its variation is known as the quantum confined Stark effect which is due to a shift in excitonic absorption with applied electric field, as described in the article: Miller et al, "Electric Field Dependance of Optical Absorption Near Bandgap of Quantum Wells Structure", *Phys. Rev. B.* Vol 32, Pg 1043 (1985). Because the MQW absorption threshold is less than the band-gap energy of AlGaAs (the material in the MQW having the larger band-gap) it allows photons with energy smaller than the bulk AlGaAs band-gap to be absorbed by the MQW. Thus, optical energy of the incident light can be absorbed by the MQW but not absorbed by AlGaAs layers external to the MQW region.

Using a CCD to create an SLM has numerous drawbacks. First, the useful optical area of a CCD SLM is severely limited because the CCD requires electrodes to be located on the same surface that the input light is incident on. Also, a CCD requires clock circuits to move the charge from one location to the next along the device, thereby requiring extra circuitry on the substrate or external thereto. Furthermore, a wire or thin film metal interconnect must be connected to each electrode to provide a clocking voltage thereto, thereby requiring many wires and/or interconnects for a high density optical application. Because of these limitations, desireable high density one and two-dimensional SLM's may not be obtained without a severe size penalty and added complexity which decreases yield and increases cost.

DISCLOSURE OF THE INVENTION

Objects of the invention include provision of a spatial light modulator (SLM) which does not require clock circuits or electrodes to move the input charge through the device, which allows either one-dimensional or two-dimensional high density operation in a small package size, and which uses two different mediums, one having desired charge transport and optical properties and the other having desired piezoelectric and/or surface acoustic wave (SAW) propagation properties.

According to the present invention, an SLM employs a semiconductor medium comprising a heterojunction acoustic wave transport (HACT) channel to transport charge by electric fields generated by a surface acoustic wave (SAW) near a multiple quantum well (MQW) region having an optical characteristic which varies with the strength of an electric field applied therein; the semiconductor medium is either intimately bonded to or located near a transparent piezoelectric insulating substrate which has a SAW injected therein. According further to the invention, the transparent piezoelectric insulating substrate is highly piezoelectric, e.g., lithium niobate ($LiNbO_3$) or lithium tantalate ($LiTaO_3$). According still further to the invention, the transparent piezoelectric insulating substrate is highly temperature stable, e.g., quartz ($SiO_2$). In still further accord to the invention, the transparent piezoelectric insulating substrate promotes a low SAW velocity, e.g., bismuth germanium oxide (BGO).

The invention represents a significant improvement over previous SLM techniques by eliminating the CCD clock circuits and surface mounted electrodes for applying the clock voltages. Furthermore, since no electrodes block the incident light, the useful optical area of the device is increased. Moreover, high density two-dimensional SLMs are easily fabricated because no wires or interconnects are required for charge propagation. Still further, using a semiconductor medium and a piezoelectric insulating substrate one can optimize the properties of each medium and eliminate the need for the semiconductor medium to be piezoelectric. Still further, using a highly piezoelectric substrate transparent to the incident light, large acoustic wave power is achieved for minimal input power. This allows for more charge carrying capability and stronger electric fields, for the same input power, than if the SAW was injected into a mildly piezoelectric semiconductor, which translates into more light modulation. Also, using a highly piezoelectric material allows the SAW transducer to have less fingers, which allows a greater frequency bandwidth for the SAW. Alternatively, using a highly temperature-stable substrate provides stable SAW velocity over a wide temperature range. Thus, light beams may be optimally positioned on the SAW and will experience minimal change. Alternatively, using a substrate having a slow SAW velocity provides a high pixel density for a given device size.

The foregoing and other objects, features, and advantages of the present invention will become more apparent in light of the following detailed description of exemplary embodiments thereof, as illustrated in the accompanying drawings.

BRIEF DESCRIPTION OF THE DRAWINGS

FIG. 1 is a cross sectional cut-away view showing the layers of a spatial light modulator (SLM) with a surface acoustic wave (SAW) superimposed on a charge transport channel, showing the potential wells created by the SAW at an arbitrary fixed time and showing the two different mediums, in accordance with the present invention.

FIG. 2 is a cross sectional cut-away view showing the layers of the semiconductor medium portion of the spatial light modulator (SLM) and the substrate from which it is grown, in accordance with the present invention.

BEST MODE FOR CARRYING OUT THE INVENTION

Referring to FIG. 1, the invention uses a thick piezoelectric insulating substrate 10 having a thickness of, e.g., 1 millimeter (mm). FIG. 1 is not drawn to scale; more specifically, the thickness of the substrate 10 is approximately 98% of the thickness of the entire device. The substrate 10 is transparent to the wavelength of light used by the spatial light modulator (SLM). Disposed on the substrate 10 is a known surface acoustic wave (SAW) transducer 12, similar to that described in copending U.S. patent application, Ser. No. 07/778,043, entitled Thick Epitaxial Layer Heterojunction Acoustic Charge Transport Multiple Quantum Well Spatial Light Modulator filed contemporaneously herewith, and is used to launch a SAW 13 into the device. The SAW transducer 12 is driven by a SAW reference 14 on the lines 16 as described in the aforementioned copending patent application. It should be understood that the SAW travels throughout the entire device down to a depth of approximately 1 to 2 SAW wavelengths, as described in the aforementioned copending patent application.

Above the piezoelectric insulating substrate 10 is a semiconductor medium 18 comprising a plurality of semiconductor layers (discussed hereinafter). The medium 18 is intimately (molecularly) bonded in a known way using a bonding process, such as that described in the article: E. Yablonovitch et al, "Extreme Selectivity in the Liftoff of Epitaxial GaAs Films", *Applied Physics Letters*, Vol. 51, No. 26, Pg. 2222 (Dec 1987), to allow the SAW 13 to propagate from the substrate 10 into the medium 18. The medium 18 comprises a buffer layer 20 made of gallium arsenide (GaAs) having a thickness of approximately 100 nanometers (nm). Other thicknesses may be used for the buffer layer 20 provided it is thin enough such that it will not absorb light. The layer 20 provides a clean GaAs layer for growing the other layers of the medium 18 therefrom and protects the other subsequent layers of the device from the atmosphere when they are transferred from the main substrate (discussed hereinafter). An optional region 21 within the layer 20 may be doped to assist in providing a vertical electric field as described in the aforementioned patent application.

Above the buffer layer 20 is a multiple quantum well (MQW) region 22 comprising a plurality of alternating semiconductor layers of AlGaAs and GaAs, e.g., 50 to 60 layers. Each layer of the MQW is approximately 6 nm thick. More or less layers having other thickness may be used as described in the aforementioned patent application. The concentration of aluminum in the AlGaAs is as described in the aforementioned patent application. The MQW region, as is known, has optical absorption and refraction properties that vary as a function of an electric field applied therein as also described in the aforementioned copending patent application.

Above the MQW region 22 is a charge transport region 24 comprising a plurality of layers including a lower charge confinement layer 26 of aluminum gallium arsenide (AlGaAs), a heterojunction acoustic charge transport (HACT) channel 28 and an upper charge confinement layer 30 made of n-doped AlGaAs (i.e.,n-AlGaAs), the sizes and doping concentrations are as described in the aforementioned copending patent application. Charge packets 19 in the HACT channel 28 invoke electric fields in the MQW as described in the aforementioned copending patent application. The location of the charge transport region 24 relative to the MQW region 22 may be reversed as described in the aforementioned copending patent application.

Above the charge transport region 24 is a cap layer 31 made of GaAs, similar to that described in the aforementioned copending patent application. Input electrodes 32,34, disposed on the cap layer 31, inject and control charge in the HACT channel 18. The material 35 below the electrode 32 is doped to facilitate such charge injection as described in the aforementioned copending patent application. Charge is extracted from the HACT channel 28 by an output electrode 36 disposed on the cap layer 31. The material 38 below the output electrode 36 is doped to facilitate such charge transfer as is also described in the aforementioned copending patent application.

One or more light beams 40 incident on a surface 44 of the device, pass through the layers 10–31 and exit as output light beams 46 from a surface 48 as described in the aforementioned copending patent application.

Referring now to FIG. 2, the semiconductor medium 18 is obtained from a larger piece of semiconductor material 50 comprising a GaAs substrate 52 and a liftoff layer 54 of aluminum arsenide (AlAs). The layers 20–31 and 54 are first grown from the GaAs substrate 52 and then, using a known "liftoff" method, the epitaxial layers are separated or floated off. The liftoff layer 54 has a thickness of 10 nm, is not intentionally doped (NID), and is substantially removed by the liftoff process. Other techniques for separating the epitaxial layers from the substrate may be used if desired.

Referring to FIG. 1, the SAW 13 injected in the transparent piezoelectric insulating substrate 10 propagates up to the HACT channel 28 and facilitates charge transfer as described in the aforementioned copending patent application. A number of different transparent piezoelectric insulating substrate materials may be used for the substrate 10, such as lithium niobate ($LiNbO_3$), lithium tantalate ($LiTaO_3$), quartz ($SiO_2$), or bismuth germanium oxide (BGO). Other materials may be used if desired provided they are transparent to the incident light and are piezoelectric. The properties desired for a particular design will determine the material for the substrate 10.

For example, $LiNbO_3$ and $LiTaO_3$ both have high piezoelectricity and thus provide high SAW power for a low input power as well as a wide bandwidth because less fingers are required for the SAW transducer, as is known. Increased SAW power provides larger SAW potential wells which provides more charge carrying capability which provides higher electric fields, thereby providing more light modulation. It should be understood that the depth of the potential energy well between the HACT channel 28 and the surrounding charge confinement layers 26,30 (discussed in the aforementioned copending patent application) may limit how much charge is capable of being carried by the SAW potential wells. Quartz ($SiO_2$) provides a SAW velocity which is very stable with temperature; however, it has weak piezoelectric properties similar to GaAs. It should be understood that because the thickness of the semiconductor region 18 is a small fraction of the substrate 10 the temperature effects on the portion of the SAW propagating in the semiconductor medium 18 will be small. However, this effect may be further minimized by the cut of quartz used for the substrate 10. BGO has a slower SAW velocity than GaAs, $LiNbO_3$, $LiTaO_3$, or quartz. Thus, the wavelength of the SAW is compressed, thereby providing a higher pixel density than the other substrate mentioned.

Instead of using the optional layer 21 to help provide a vertical electric field, the substrate 10 may be cut and an optional layer 62 of evaporated metal thin film composed of aluminum (Al), gold (Au), or another metallic conductor, may be patterned on the lower surface of the region 10 to provide a ground plane, thereby providing the same feature. The layer 60 should be placed deep enough (e.g., 2 wavelengths or 40 microns at a SAW frequency of 140 MHz) from the top surface of the substrate 10 to allow the SAW to damp out and should not located where the light is to pass (to avoid reflection). If the layer 60 is used, a layer 62 may be attached to the underside of the layer 60 for support. Any transparent material may be used for the layer 62.

It should be understood that the temperature coefficient of expansion of the insulating substrate 10 may be different from that of the semiconductor medium 18. If that is the case, the two mediums may expand and contract different amounts over temperature. Thus, to prevent separation of the two mediums 10,18, the temperature environment with which the SLM is contained may need to be controlled within certain acceptable boundaries.

Also, the semiconductor medium 18 need not be bonded to the insulating substrate 10 but just placed close to it with an air gap between the two, as described in U.S. Pat. No. 4,990,814, entitled Separated Substrate Acoustic Charge Transport Device. In that case, the charge is moved along the HACT channel 28 by electric fields, generated by the SAW in the substrate 10, which extend across the air gap into the medium 18. Also, if an air gap is used, the substrate need not be removed from the semiconductor material 50, and the material 50 may be flipped over so the cap layer 31 would be the layer closest to the substrate 10. This places the HACT channel 28 close to the substrate 10, which assists the electric fields generated by the SAW to propagate the charge in the HACT channel 28. In that case, the semiconductor medium will likely be wider than the piezoelectric substrate 10 to allow wires to be attached to the input and output electrodes 32,34,36 on the underside of the semiconductor medium 18.

Furthermore, it should be understood that the alternatives to and variations on the surfaces to receive the incident light, the charge injection techniques, the placement of the MQW region relative to the charge transport region, the type of charge transported, the optical parameters varied, one-dimensional and two-dimensional configurations, and additional doping for an inherent electric field, discussed in the aforementioned copending patent application are also applicable to the present invention.

Also, it should be understood that the MQW region 22 may be composed of other materials such as indium gallium arsenide (InGaAs) instead of AlGaAs, or InGaAs instead of GaAs, as described in copending U.S. patent application Ser. No. 07/778,043 filed contemporaneously herewith. If AlGaAs/InGaAs or AlGaAs/GaAs are used for the MQW, the GaAs buffer layer 20 will be transparent to the incident light, thereby allowing the layer 20 to be thicker than described hereinbefore. If the substrate 52 (FIG. 2) is not removed, as in the air-gap case, and an AlGaAs/GaAs MQW is used, it should be understood that the portion of the device having light incident upon it must have the GaAs substrate etched away to prevent light absorption thereby.

Because less fingers are needed for the SAW transducer 12 when a highly piezoelectric substrate 10 is used, a wide range of frequencies may be generated by it, i.e., it has a high bandwidth, as mentioned hereinbefore. Consequently, the SAW reference may be a varying frequency, amplitude, and/or phase signal, instead of merely a constant frequency signal discussed hereinbefore. If that is the case, the SAW characteristics provide another input variable that may be used to modulate the light and process optical information, thereby providing a total of three input variables: light, charge, and SAW characteristics.

Although the invention has been described and illustrated with respect to exemplary embodiments thereof, it should be understood by those skilled in the art that the foregoing and various other changes, omissions and additions may be made without departing from the spirit and the scope of the invention.

We claim:

1. A spatial light modulator, comprising:
   a thick piezoelectric insulating substrate, transparent to incident light;
   a semiconductor medium including:
      a multiple-quantum-well region, having the incident light passed therethrough, having an optical absorption threshold energy substantially equal to the energy of the incident light, and having an optical parameter which is altered in response to an electric field applied therein; and
      a charge transport region, made of semiconductor material, located contiguous with said multiple-quantum-well region, and having a charge transport channel therein, for transporting charge along said charge transport channel, said charge applying said electric field within said multiple-quantum-well region, and for preventing the escape of charge from said charge transport channel;
   charge supply means for passing said charge to and from said charge transport channel;
   surface acoustic wave means disposed on said piezoelectric insulating substrate for launching said surface acoustic wave into said piezoelectric substrate; and
   said thick piezoelectric insulating substrate having a thickness to allow a surface acoustic wave to propagate therein and being near enough to said semiconductor medium to cause said surface acoustic wave to generate an electric field strong enough to transport said charge along said charge transport channel.

2. The spatial light modulator of claim 1 wherein said thick piezoelectric insulating substrate is intimately bonded to said semiconductor medium.

3. The spatial light modulator of claim 1 wherein said optical parameter altered by said multiple-quantum-well region is the optical absorption thereof.

4. The spatial light modulator of claim 1 wherein said multiple-quantum-well region has a plurality of alternating layers of two different semiconductor materials.

5. The spatial light modulator of claim 4 wherein said two different semiconductor materials are AlGaAs and GaAs.

6. The spatial light modulator of claim 4 wherein said two different semiconductor materials are InGaAs and GaAs.

7. The spatial light modulator of claim 4 wherein said two different semiconductor materials are InGaAs and AlGaAs.

8. The spatial light modulator of claim 1 wherein said charge transport region comprises a HACT channel made of GaAs, as said charge transport channel, surrounded on upper and lower sides by charge confinement layers formed from AlGaAs.

9. The spatial light modulator of claim 1 wherein said thick piezoelectric insulating substrate comprises LiNbO$_3$.

10. The spatial light modulator of claim 1 wherein said thick piezoelectric insulating substrate comprises LiTaO$_3$.

11. The spatial light modulator of claim 1 wherein said thick piezoelectric insulating substrate comprises quartz.

12. The spatial light modulator of claim 1 wherein said thick piezoelectric insulating substrate comprises BGO.

13. The spatial light modulator of claim 1 wherein said surface acoustic wave means has a wide bandwidth capable of generating an amplitude modulated surface acoustic wave.

14. The spatial light modulator of claim 1 wherein said surface acoustic wave means has a wide bandwidth capable of generating a frequency modulated surface acoustic wave.

15. The spatial light modulator of claim 1 wherein said surface acoustic wave means has a wide bandwidth capable of generating a phase modulated surface acoustic wave.

* * * * *